No. 617,215. Patented Jan. 3, 1899.
A. ANGEL.
MAGAZINE CAMERA.
(Application filed June 15, 1898.)

(No Model.) 2 Sheets—Sheet 1.

Witnesses.
Inventor:
A. Angel

No. 617,215. Patented Jan. 3, 1899.
A. ANGEL.
MAGAZINE CAMERA.
(Application filed June 15, 1898.)
(No Model.) 2 Sheets—Sheet 2.

Witnesses. Inventor:
A. Angel.
By Attorneys.

THE NORRIS PETERS CO., PHOTO-LITHO., WASHINGTON, D. C.

UNITED STATES PATENT OFFICE.

ANDREA ANGEL, OF LIVERPOOL, ENGLAND.

MAGAZINE-CAMERA.

SPECIFICATION forming part of Letters Patent No. 617,215, dated January 3, 1899.

Application filed June 15, 1898. Serial No. 683,518. (No model.)

*To all whom it may concern:*

Be it known that I, ANDREA ANGEL, a resident of 34 Balliol road, Bootle, Liverpool, in the county of Lancaster, England, have invented new and useful Improvements in Photographic Cameras, (for which an application for patent has been filed in Great Britain, dated March 1, 1898, No. 5,045,) of which the following is a full, clear, and exact description.

This invention relates to improvements in magazine-cameras for storing and successively exposing a series of sensitized films separated by backing-cards alternated with the films in the usual manner; and the invention consists, essentially, in the mechanism whereby the films are prevented from buckling and are held perfectly flat during exposure and whereby the release of the films in succession and the disposal of the exposed films and their backing-cards are effected, a special object of the invention being to dispense with notching the films or otherwise adapting them for the action of the releasing mechanism.

The invention will be described with reference to the accompanying drawings, forming part of this specification, wherein—

Figure 1:
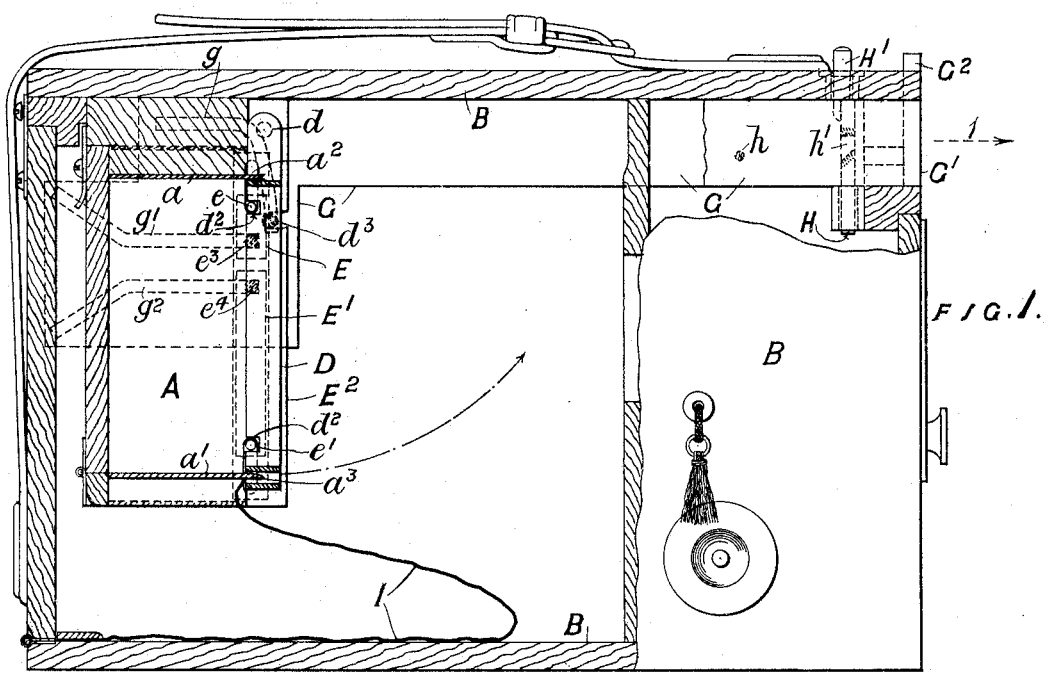
Figure 2:
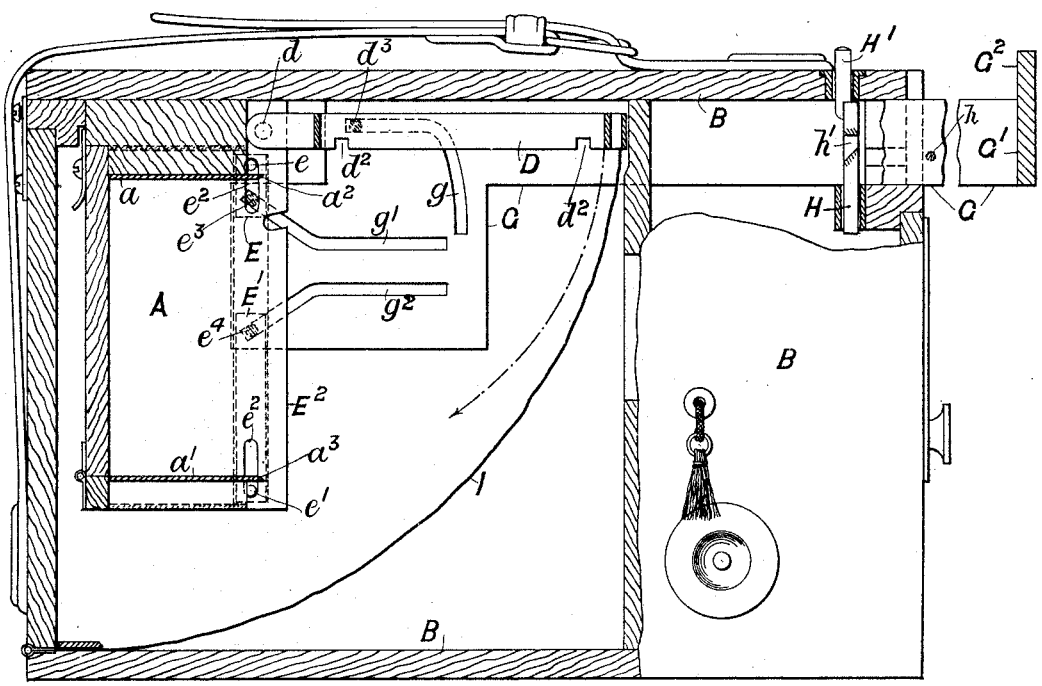
Figure 3:
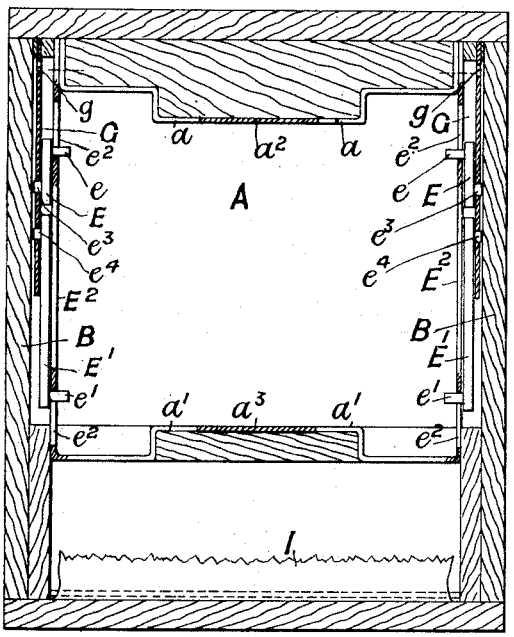
Figure 5:
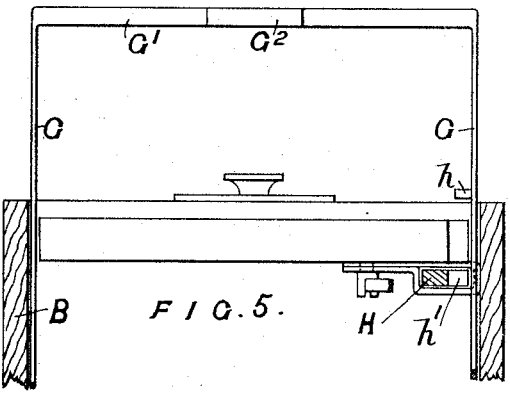
Figure 6:
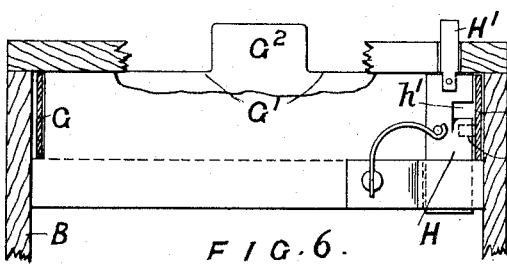
Figure 7:
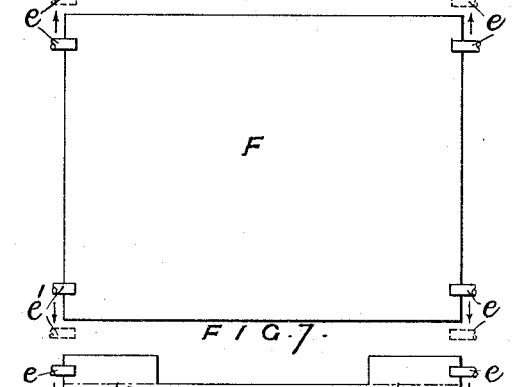
Figure 8:
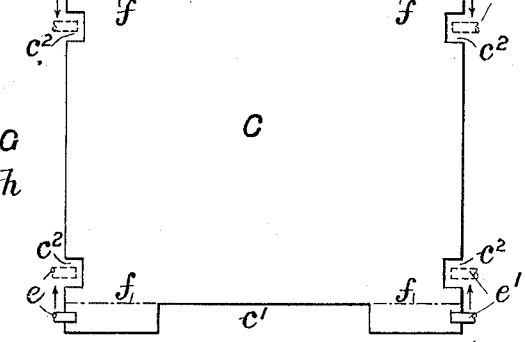

Figure 1 is a longitudinal section showing the mechanism in position to retain the foremost film in position for exposure, the pack of films and cards and the spring-pressed backing-plate being omitted to avoid obscuring the mechanism. Fig. 2 is a similar section showing the mechanism after being operated to release the exposed film and retain its backing-card. Fig. 3 is a cross-section of the magazine looking backward, and Fig. 4 a similar cross-section looking forward, the mechanism in both figures being in position to retain the foremost film in position for exposure. Fig. 5 is a sectional plan, and Fig. 6 a cross-sectional elevation, of the means of actuating the film-releasing mechanism. Figs. 7 and 8 show a film and a backing-card, respectively, and illustrate how the film and card successively escape from the retaining-pins during the opposite movements of the latter.

The same letters of reference denote like parts in all the figures.

The magazine-chamber A, which is a fixture within the upper part of the body of the camera B, has guides $a$ $a'$ in the form of broad bars offset from and extending from front to back of the top and bottom of the magazine. The films are of plain rectangular form, as shown at F, Fig. 7, and fit between the opposing faces of the said guides, while the backing-cards C are of the same width as the films, but of greater height, and have notches $c\,c'$ cut in them to fit over the said guides, so that the corner portions of the cards project above and below the top and bottom edges of the films. (Represented by the dotted lines $f$ in Fig. 8.) The cards are also provided with pairs of notches $c^2$ in the side edges thereof. The pack of alternated films and cards rests upon the lower guide $a'$ and is pressed toward the exposure plane by a spring-actuated pusher-plate in the usual manner.

Figure 4:
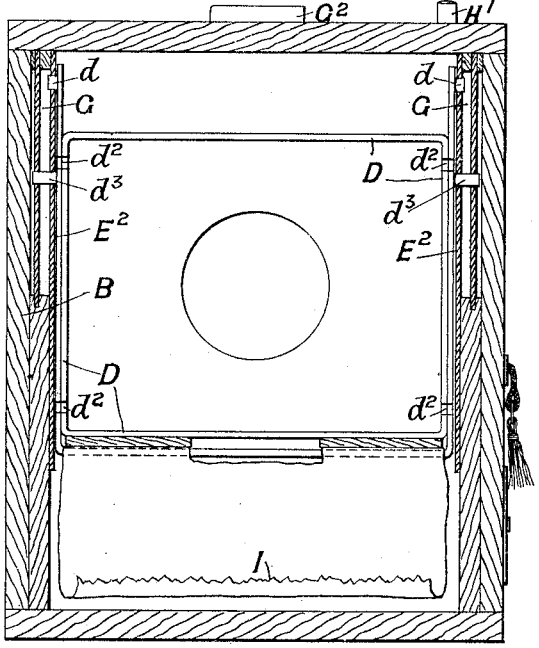

The means by which the requisite flatness of the film is insured during exposure consists of a rectangular frame D, pivoted on a horizontal axis $d$ at the upper part, so that it may close against the front of the magazine, as shown in Figs. 1, 3, and 4, or be raised, as shown in Fig. 2. The internal dimensions of the frame are slightly less than the dimensions of the film F, and the frame, when in position shown in Figs. 1, 3, and 4 at the front of the magazine-chamber, projects inward beyond the walls of the same at all four sides, so as to form a continuous marginal abutment for all four edges of the foremost film, which is pressed up against the same by the spring-presser at the back. By this means the buckling of the film under the pressure from behind by reason of its bearing against detents or other retaining devices only at isolated points is avoided. The abutment-face of this frame D therefore coincides with the exposure plane for the film, and in said face are notches $d^2$ to admit pairs of escapement-pins $e\,e\,e'\,e'$, that project inward beyond the two opposite sides of the magazine, so as to form temporary abutments for the foremost film when the frame D is raised. These pins are carried by oppositely-moving sliding plates E E E' E', fitted to work in guide-grooves in plates $E^2$ at the sides of the magazine, the pins projecting through slots $e^2$. In their normal position (shown in full lines in Fig. 7) the pins are situated in front of the foremost film, so that when the frame D is raised the film will be prevented by the pins from moving forward until by the movement of the slides E E E' E' in opposite directions the pins $e\ e\ e'\ e'$ are moved from the full-line position, Fig. 7, to the dotted-line position shown in the same figure, whereupon the film is free to fall forward if the camera be held at a slight inclination. In that position of the pins they come in front of the projecting or offset corner portions of the backing-card C immediately behind the film, as shown in Fig. 8 in full lines, (which position corresponds to the dotted position in Fig. 7,) whereby the card is retained. By the inward movement of the plates E E' the pins $e\ e'$ are returned to normal position and coming then opposite the notches $c^2$ in the card, as shown in dotted lines in Fig. 8, the card C is then free to fall forward also, thus completing the operation of changing a film.

The means whereby the plates E E' are operated are as follows, it being understood that the plates E E' are alike at both sides of the camera and are operated simultaneously and by the same means, so that the following description applies equally to the plates at both sides of the camera: The pin-carrying plates E E' are guided so as to be capable only of rectilineal sliding motion in the up-and-down direction, and they, as well as the swinging frame D, are operated by a longitudinally-sliding cam-plate G. For this purpose the cam-plate has formed in it a cam-slot $g$, which engages with a stud $d^3$ on the side of the frame D, and also other cam-slots $g'\ g^2$, which engage with studs $e^3\ e^4$, respectively attached to the sliding plates E E'. The cam-slots $g\ g'\ g^2$ are so shaped that during the first portion of the forward motion of the cam-plate G in the direction of the arrow 1, Fig. 1, the frame D alone will be moved to the position shown in Fig. 2, the plates E E' and pins $e\ e'$ remaining stationary in the position shown in Fig. 1. While during the latter part of said forward motion of the cam-plate G the frame D will remain stationary in the raised position, Fig. 2, during the movement of the plates E E' and pins $e\ e'$ from the position shown in Fig. 1 to the position shown in Fig. 2. This alternate movement of frame D and plates E E' is obtained by providing the slots $g'\ g^2$ with straight inactive portions coinciding in direction with the direction of motion of the cam-plate G, so that the plate G may move relatively to the studs $e^3\ e^4$ without acting on them while the active part of the cam-slot $g$ is acting on the stud $d^3$ of frame D, and conversely the slot $g$ has a straight portion coinciding in direction with the motion of cam-plate G, so that the latter may move relatively to the stud $d^3$ without acting on it, while the oppositely-inclined active portions of the slots $g'\ g^2$ are acting on studs $e^3\ e^4$ to move the plates E E' and pins $e\ e'$ in opposite directions. The order of the movements is reversed on the return motion, the pins being first moved and then the frame D, the latter on completing its motion being firmly held at the plane of exposure. The cam-plates G at opposite sides of the camera are united by a cross-bar G' at the front of the camera-body, provided with a thumb-piece $G^2$, by which the cam-plates may be moved forward simultaneously. The reciprocating movement of one of the cam-plates G may be made to actuate in any well-known way a counter consisting of a numbered ratchet-wheel or other similar device to indicate how many exposures have been made.

In order on the return movement to delay the descent of the frame D for a sufficient time after the pins $e\ e'$ have returned to normal position to allow the backing-card to fall, a pin $h$, projecting from the cam-plate G, engages with a spring-pressed latch H and arrests the movement just as the frame is about to be lowered, so as to necessitate a pause while pin $h$ is released, a notch $h'$ in the latch being caused (by pressing in the button H') to register with said pin. The edge of notch $h'$ is so beveled as to allow the cam-plate G to move freely in the opposite direction.

In order to prevent all possibility of the film being displaced in the upward or the downward direction by the movement of the pins $e\ e'$, the guides $a\ a'$ are extended slightly forward by broad tongues $a^2\ a^3$, the lower one entering a slot between the two lower members of the frame D when the latter is in its normal position.

To the lower end of the frame D is attached a flexible blind I, of opaque cloth, extending the full width of the camera-body, the other end of the strip being made fast at the rear lower part of the camera-body below the magazine-chamber A, so that when the frame D is raised, as shown in Fig. 2, the blind will not only serve to protect the unexposed film from accidental exposure in setting the lens-shutter and adjusting the diaphragm, but will also form an incline on which the films and cards will slide down and by which they will be conducted to the space beneath the magazine. When the frame D is lowered to operative position, as shown in Fig. 1, the exposed films are partly enfolded by this blind I, and are thereby protected from light during the subsequent exposure of the succeeding films.

As no notching or preparation of the films is required, it will be evident that the camera, although primarily intended for films, may also be used for glass plates, and that wherever in this specification the term "film" is used a plate is intended to be included.

I claim—

1. In a magazine-camera, the combination with the magazine, of a forwardly-swinging frame pivoted at the upper part and adapted to close against the open front of the magazine and to form a continuous marginal support to the film at all four sides thereof.

2. In a magazine-camera, the combination with the magazine, of a forwardly-swinging frame pivoted at the upper part and adapted to close against the open front of the magazine and to form a continuous marginal support to the film at all four sides thereof, and of oppositely-moving pairs of detent or escapement pins projecting in front of the foremost film at the two opposite edges, so as to temporarily retain the film at the exposure plane when the said abutment-frame is withdrawn, the said pins being adapted to be moved beyond the other two edges of the film so as to then prevent it from escaping.

3. In a magazine-camera, the combination with a forwardly-swinging frame pivoted at the upper part and adapted to form a continuous marginal support or abutment for the film at all four sides thereof, and with pairs of detent-pins oppositely movable as described, of backing-cards adapted to be arranged between the films and provided with corner extensions and with notches, the corner extensions of the cards being adapted to be engaged by the pins when the same are moved outward to disengage the film, and the notches being adapted to give passage to the pins when they are moved inward again to disengage the card and to retain the next following film.

4. In a magazine-camera, the combination with a film-abutment frame hinged to swing as described, and with pairs of detent-pins oppositely movable as described, of a pair of cam-slotted sliding plates coupled together and moving as one, the said cam-plates engaging with the swinging frame and with sliding plates on which the detent-pins are carried, the cam-slots being so formed and arranged that the frame will first be swung forward and then the plates will be moved in opposite directions and conversely, substantially as specified.

5. In a magazine-camera, the combination with a film-abutment frame hinged to swing as described, with pairs of oppositely-movable detent-pins, and with a pair of sliding cam-plates actuating the swinging frame and detent-carrying plates as described, of a latch engaging the one cam-plate on its return motion so as to insure the necessary pause to permit the backing-card to fall as described.

6. In a magazine-camera, the combination with a film-abutment frame hinged to swing as described, of a flexible blind attached to the said swinging frame and to a fixed point so as to act as an inclined guide for the falling films, as well as a means of enfolding and retaining the films after they have fallen as described.

ANDREA ANGEL.

In presence of—
J. ARMES IRVINE,
LORENZO VALENCIA ANGEL.